(12) United States Patent
Rahnavard et al.

(10) Patent No.: US 7,196,716 B2
(45) Date of Patent: Mar. 27, 2007

(54) ELECTRONIC TRAPPING IMPLEMENTATION IN IMAGER WITH LASER DRIVER

(75) Inventors: Mohammad H. Rahnavard, Rancho Palos Verdes, CA (US); Mehrdad Zomorrodi, West Hills, CA (US)

(73) Assignees: Xerox Corporation, Stamford, CT (US); JP Morgan Chase Bank, Houston, TX (US)

( * ) Notice: Subject to any disclaimer, the term of this patent is extended or adjusted under 35 U.S.C. 154(b) by 915 days.

(21) Appl. No.: 10/260,612

(22) Filed: Sep. 27, 2002

(65) Prior Publication Data

US 2004/0061771 A1    Apr. 1, 2004

(51) Int. Cl.
*B41J 2/47* (2006.01)
(52) U.S. Cl. .................. 347/239; 347/255
(58) Field of Classification Search ........ 347/239–240, 347/250–255, 135, 142–144; 358/534; 382/275
See application file for complete search history.

(56) References Cited

U.S. PATENT DOCUMENTS

| 4,180,822 A | * | 12/1979 | Hudson et al. ............. 347/250 |
| 4,414,583 A | | 11/1983 | Hooker ....................... 358/300 |
| 4,801,978 A | | 1/1989 | Lama .......................... 355/69 |
| 4,884,083 A | | 11/1989 | Loce et al. ................. 346/108 |
| 5,144,419 A | * | 9/1992 | Nakatsuka et al. ......... 358/534 |

* cited by examiner

*Primary Examiner*—Hai Pham
(74) *Attorney, Agent, or Firm*—Oliff & Berridge, PLC

(57) ABSTRACT

An electronic trapping implementation in imager with laser driver is provided by comparing an output image from the imager to a reference image to obtain a difference image and calculating one or more frequency and amplitude modulations based on the difference image and applying the one or more frequency and amplitude modulations to the imager until the difference image is eliminated.

20 Claims, 9 Drawing Sheets

ELECTRONIC TRAPPING IMPLEMENTATION IN IMAGER WITH LASER DRIVER

CO-REFERENCE TO RELATED APPLICATION

The present application is related to the following co-pending application: Ser. No. 10/232,476 entitled "Electronic Banding Suppression Due to Vibration with LED Arrays Bar Driver" and Ser. No. 10/232,438 entitled "Banding Suppression Due to Vibration in Imager with Laser Driver" and commonly assigned to the present assignee, the contents of which are both herein incorporated by reference.

BACKGROUND

Scanned light beam imaging is employed for various purposes including electrophotographic printing. In such systems used for printing, a light beam generated, for example, by a laser is selectively modulated to vary its amplitude while it is scanned laterally across a moving photoconductor to selectively discharge the photoconductor. Such systems have been binary in nature ("on" or "off") to accomplish printing of character information by selectively either exposing the photoconductor or leaving it unexposed. To insure complete exposure, adjacent scan lines are usually overlapped slightly. Thus, any slight misalignment of the scans or change in beam size would not be noticed.

Therefore, a partial warranty requires stable and repeatable devices. Many well-known effects, however, adversely impact the stability and repeatability of Xerographic engines. For example, photoreceptor discharge curves are unstable due to charge trapping and poisoning. Developability changes as toner concentration changes. It also is affected by the toner size distribution changes produced by the size selective nature of most Xerographic development systems; by toner and developer degradation due to the impaction and contamination they experience in the extremely harsh environment of the developer housing; and by roll-to-photoreceptor spacing variation due to mechanical problems like roll runout. The charging process is also affected by dirt on the coratron wires.

In addition, there are many other sources of instability and non-repeatability. These instabilities would not matter if the color shifts they produce were not visible. Unfortunately the human eye is exquisitely sensitive to color shifts. Trapping is a device specific command that compensates for registration when two colors are placed next to each other. Instead of allowing a white space to open up when the registration is imperfect, trapping swells each of the two color areas so that an overlap area occurs between butting color areas, which absorbs the misregistration. In anticipatory composition, the creator of the electronic document uses definitions and coding within the document based on the output media selected. This controls the document output, but also limits how the document can be printed or distributed.

It is therefore an object of the present invention to eliminate the perception of gaps in color printing in such optical imaging systems without requiring substantial tightening of allowable optical or electromechanical tolerances.

SUMMARY

An electronic trapping implementation in imager with laser driver is provided by comparing an output image from the imager to a reference image to obtain a difference image and calculating one or more frequency and amplitude modulations based on the difference image and applying the one or more frequency and amplitude modulations to the imager until the difference image is eliminated.

DETAILED DESCRIPTION

Figure 1:
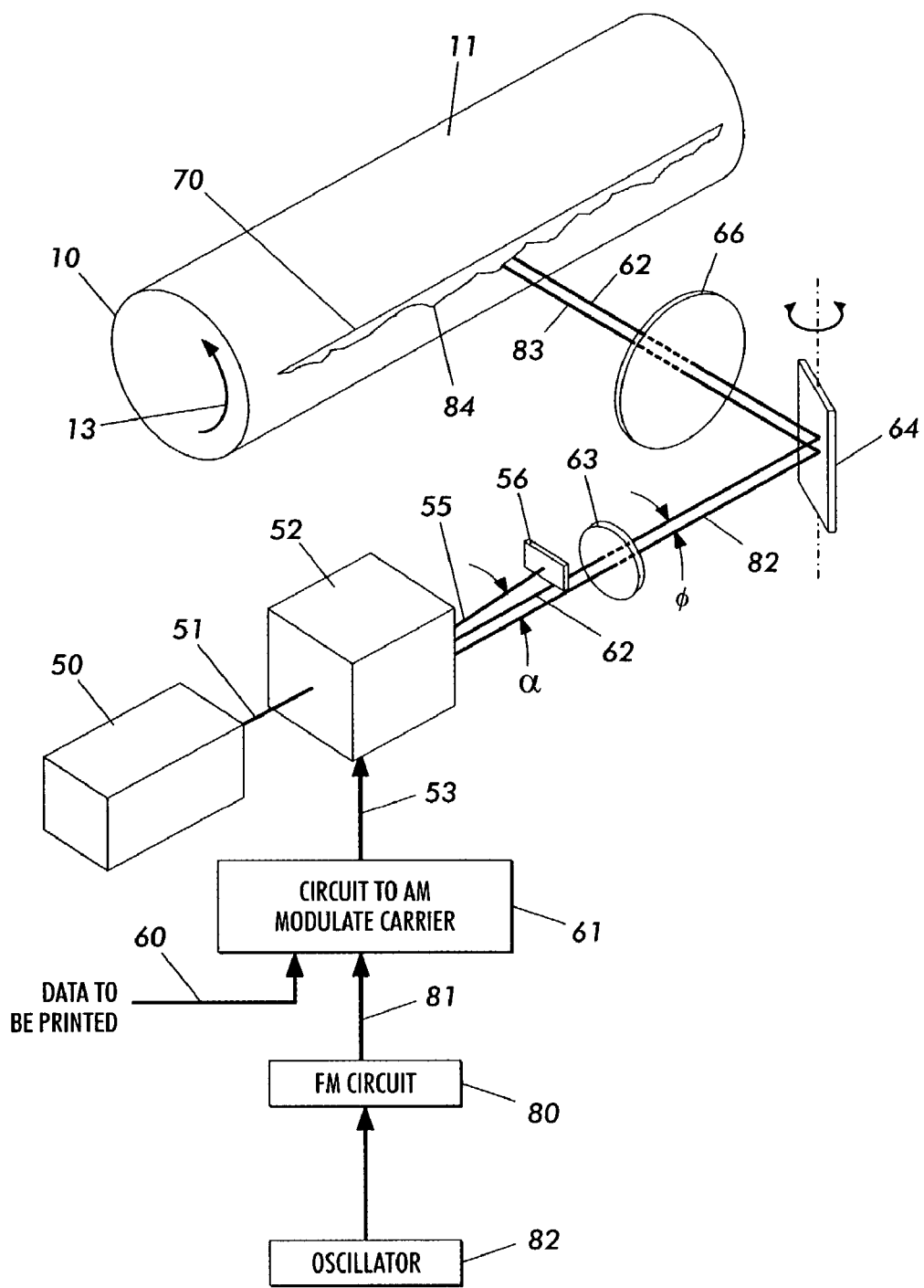
FIG. 1 is a diagrammatic view of a printing device employing a scanned light beam imaging utilizing a laser imager.

FIG. 1 illustrates a copier/printer machine employing scanned light beam imaging on an electrophotographic drum 10. The surface of the drum comprises a photoconductor which is either coated on the surface of the drum or is in the form of a sheet material wrapped around the surface of the drum. As shown in FIG. 1, a laser 50 generates a coherent light beam 51 which is directed through an acousto-optic modulator 52. The acousto-optic modulator selectively deflects the light beam 51 in accordance with an input signal provided at input 53. The unmodulated, or "zero-order" beam 55 from the acousto-optic modulator is intercepted by a knife edge 56.

A signal representing the data to be printed is supplied at input 60 to amplitude modulation circuit 61. The amplitude modulation signal is supplied by circuit 61 to input 53 of the acousto-optic modulator. The acousto-optic modulator deflects the light beam 51 in accordance with the presence or absence of the amplitude modulation in the direction of $\alpha$. The amount $\alpha$ of deflection is determined by the modulation frequency.

The modulation signal applied at input 53 is an amplitude modulated carrier signal. This can result in a grey-scale effect on the imaging of the light beam in that the amplitude modulation varies the duration of the carrier causing the light beam to be deflected beyond the knife edge 56. The deflected light beam 62 is projected through beam expanding lens 63 to beam deflector 64. Beam deflector 64 may comprise an oscillating mirror or a rotating mirror assembly having many facets about the periphery thereof. The beam deflected by deflector 64 is projected through imaging lens 66 onto the photoconductor surface 11 of drum 10. Beam deflector 64 causes the modulated beam 62 to be scanned axially of drum 10 along line 70 across the photoconductor surface 11.

As discussed above, the amplitude modulation at input 53 to the acousto-optic modulator results in the deflection of the coherent light beam 51, as shown by deflected beam 62. The modulation is of a carrier signal. Therefore, amount of amplitude modulation controls the time duration that the beam 62 will be deflected beyond knife edge 56, resulting in different exposure times of the portion of the photoconductor 11 being scanned.

The beam spot size, and therefore the width of the trace 70 made by beam 62 on the photoconductor 11 may be the subject of slight variations. These variations may be from machine to machine, as variations in the provided laser or in the acousto-optic modulator, or in distance tolerances, as in the distance from lens 66 to surface 11 of drum 10. Variations may also occur due to different operating conditions for a single machine, such as temperature causing a difference in laser output, etc. Lastly, and most importantly, periodic variations may occur within a single machine, such as vibrations within the printhead, misalignment of the rotating deflector, or facet-to-facet angular variations on the deflector itself.

Any of these variations results in the appearance of interstices between adjacent scan lines 70. For example, should the beam be slightly low on one scan, and normal or slightly high on the next adjacent scan, the two scan lines will overlap slightly. On the other hand, should the one scan be slightly high, and the next adjacent scan normal or slightly low, the adjacent scan line will be separated slightly. Either the overlap or the separation of adjacent scan lines are defined herein as interstices.

By moving the light beam orthogonally with respect to the scan direction as shown by scan line 70 it breaks up any unscanned or overlapped interstices between adjacent scan lines to make the interstices appear nearly invisible. The light beam is moved orthogonally by using frequency modulation circuit 80 for supplying a frequency modulation carrier signal to carrier input 81 of amplitude modulation circuit 61. An oscillator 82 supplies the basic carrier signal to the frequency modulation circuit 80.

As will be described, frequency modulation circuit 80 and AM modulator 61 includes a source of amplitude and frequency modulation means for modulating the carrier signal in accordance with a set of governing equations. The signal supplied by frequency modulation circuit 80 to input 81, therefore, comprises a carrier signal which varies in frequency in accordance with theses governing equations. The frequency modulated carrier is then amplitude modulated by circuit 61 and supplied at input 53 of acousto-optic modulator 52. The resultant variations in frequency cause the amplitude modulated light beam 62 to be deflected as shown by the dither angle $\phi$. which is about the nominal amplitude modulation $\alpha$.

Therefore, producing a dither deflection of beam 83 orthogonal to the scan line produces a scan line 84 variably displaced from the scan path 70 with no dither. The displacement of the scan path 84 is shown in FIG. 1 greatly exaggerated for the purpose of illustration. In reality, the dither displacement is very small, typically much less than the center-to-center displacement between adjacent scan lines.

Figure 2:
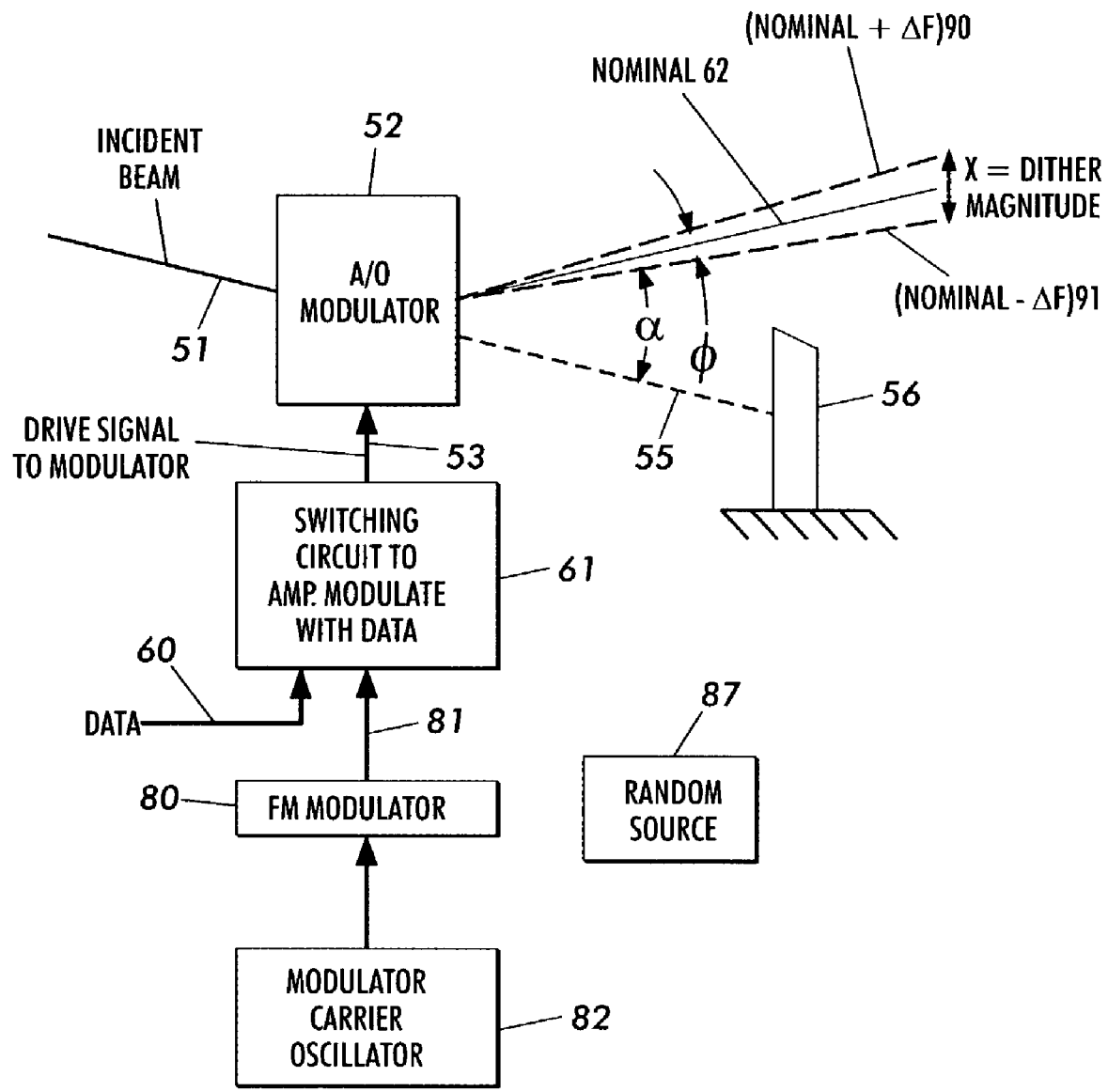
FIG. 2 is a detailed diagrammatic view of the light beam modulation of FIG. 1.

The circuitry of FIG. 1 is replicated in FIG. 2 with a diagrammatic illustration in more detail of the effect of the acousto-optic modulator 52 upon the incident light beam 51. The zero-order beam 55 is the path taken by the unmodulated beam. When an input signal of high frequency is supplied to input 53 of the acousto-optic modulator, the incident beam 51 is deflected to the nominal deflection path 62. Using a frequency of, for example, 80 MHz, as supplied by oscillator 82, the resultant deflection angle is 13.9 milliradians. The nominal deflection is shown by $\alpha$.

The acousto-optic modulator 52 works on the principle that an acoustic wave generated by the signal at input 53 deflects the light beam in accordance with frequency of the input signal. The amplitude modulation provided by circuit 61 does not in itself provide grey scale, but rather supplies the drive signal from oscillator 82 at a sufficient amplitude to cause operation of the acousto-optic modulator.

A different way of producing grey scale is to control the power of the laser or other light source providing the beam 51. Thus, the presence or absence of data will be controlled by the amplitude modulation signal appearing at input 60, but the grey scale level of that information will be controlled by the power of the incident beam 51.

In either of these grey scale reproduction techniques, any interstices between adjacent scan lines will be highly visible, as discussed above.

These interstices may be broken by the application of dither through the operation of circuit 80 of FIG. 1, shown in FIG. 2 as comprising FM modulator 80 and a random source 87. Dither has two properties which may be specified: (1) the maximum amount, or amplitude, of dither, and (2) the frequency, or rate of change, of the dither. Dither amplitude comprises the difference in amount of deflection from that comprising the nominal path at the center frequency modulation frequency 62. The total extent comprising the maximum amplitude of dither comprises the angular difference $\phi$. between path 90 and 91. At the photoconductor, this total difference may be represented as the distance X. This amplitude is controlled by varying the total frequency excursion of the modulator carrier derived from circuit 82 from its nominal frequency. The frequency, or rate of change, of the dither is controlled by random source 87 in modulating the carrier at FM modulator 80 by controlling the rate of change of the modulator carrier frequency.

The maximum amplitude of the dither chosen depends upon the maximum displacement error expected between adjacent scan lines. For example, the maximum displacement error, comprising the overlap or the separation between adjacent scans of the laser beam, may comprise 0.0004 inches.

With the exemplary nominal carrier frequency of circuit 80 at 80 MHz, a dither maximum amplitude X of 0.4 mils, would, in an exemplary machine having a distance of approximately 25 inches between the acousto-optic modulator 52 and the photoconductor 11, would comprise 16 microradians. Since the 80 MHz input signal at input 53 to the acousto-optic modulator produces a deflection a of 13.9 milliradians, the total frequency change, or $\Delta f$, required to produce the desired 16 microradian dither $\phi$ is 46 KHz.

Figure 3:
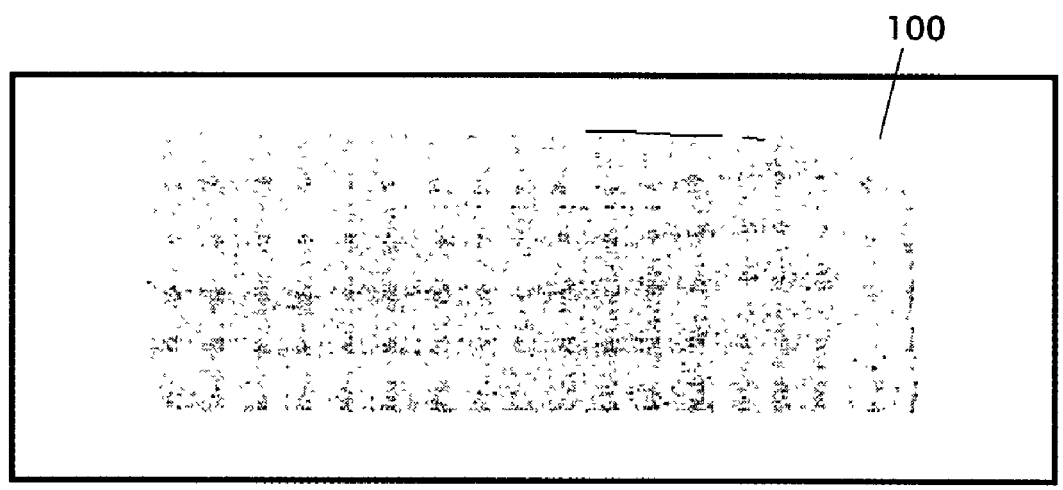
FIG. 3 is an example of xerographic print with halftone banding when the vibration error consists of a single frequency.
Figure 4:
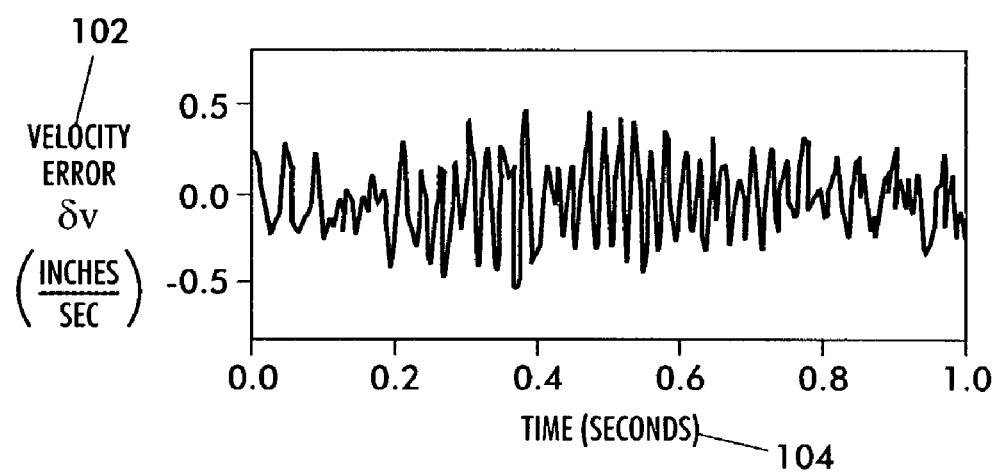
FIG. 4 is a graph showing measurement of photoconductor velocity error vs. time for a prototype xerographic copier.

An example of xerographic print 100 with halftone banding when the vibration error consists of a single frequency is shown in FIG. 3. FIG. 4 shows a graph of measurement of photoconductor velocity error 102 versus time 104 for a prototype xerographic copier where the nominal velocity is 8.1 in./sec. As seen in FIG. 4, the velocity error 102 is not constant and has a modulation on the order of ±4%.

Figure 5:
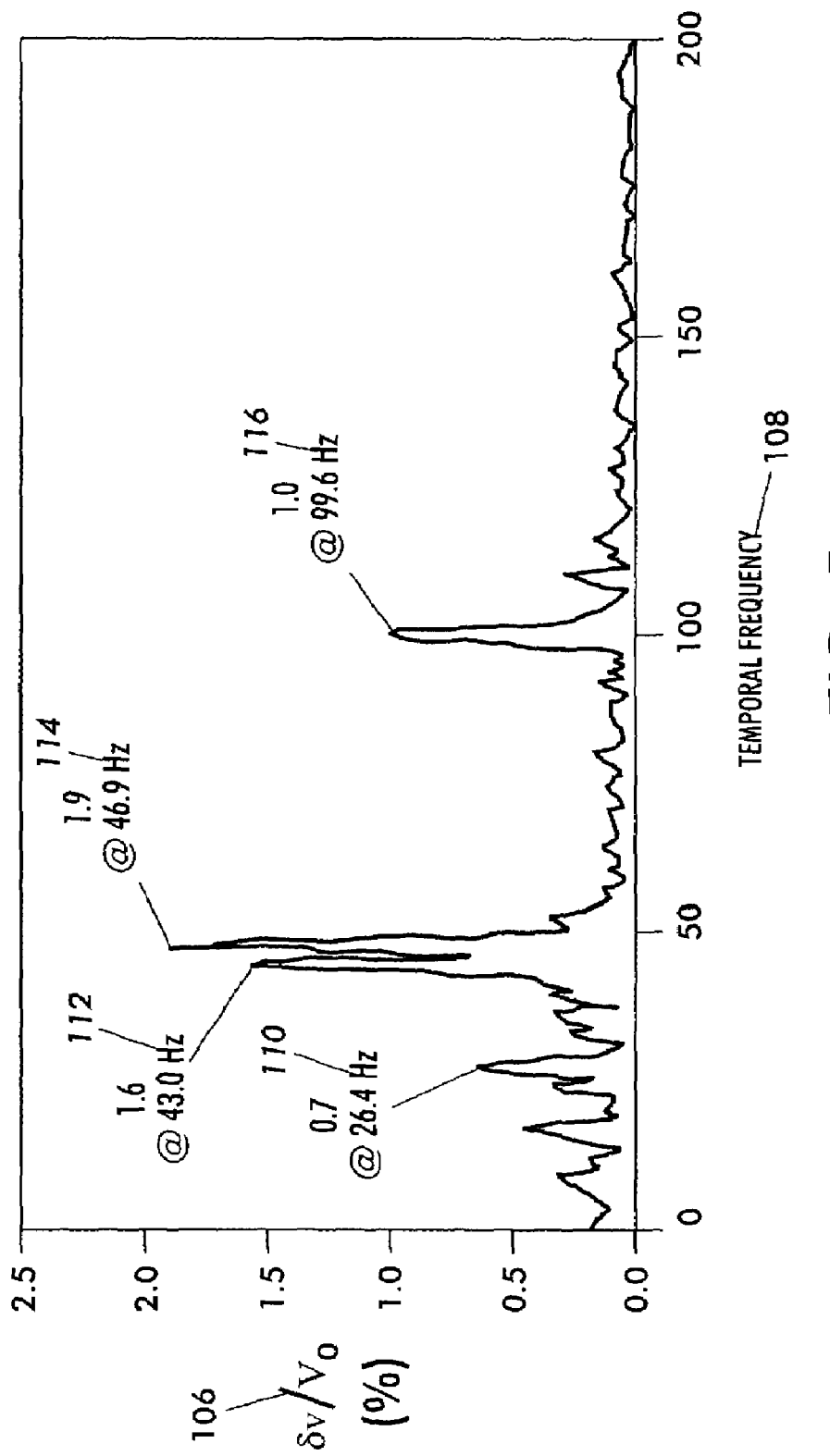
FIG. 5 shows a graph of the fourier transform of the velocity error in FIG. 4.

FIG. 5 shows a graph of the fourier transform 106 of the velocity error 102 in FIG. 4. FIG. 5 reveals a spectrum of four major frequencies 108 resulting from the prefuser transport (26 Hz) 110, the cleaner (43 Hz) 112, the photoconductor drive (46.9 Hz) 114 and the main drive motor (99.6 Hz) 116. The zero-to-peak amplitude of each frequency component is between ½ and 2% of normal velocity. Vibrations such as these, when present in a printer, can result in serious print defects including banding in halftones.

The signal in FIG. 5 is characterized as having an amplitude and frequency as follows:

$$V = V_0 + a\cos(2\pi ft) \quad (1)$$

where $V_0$ is the nominal velocity;
a is the amplitude of error velocity due to vibration; and
f is temporal frequency due to vibration.

As the laser imager exposes photoconductor 11, any vibration by the photoconductor 11 in the process direction (perpendicular to the raster lines) will cause undesirable variation in lines and patterns running across the process (parallel to the raster lines). The exposure received by a line on the photoconductor 11 at the spatial coordinate x' is given by:

$$E(x') = \int_{-\infty}^{\infty} H_1(x)H_2(t)/v(t)dx \quad (2)$$

where $H_1(x)$ is the spatial variation of the image irradiance profile in the process direction (x), and $H_2(t)$ describes the time variation of the desired irradiance pattern (eg. on at time zero, off at time $t_1$, with constant irradiance). $H_2(t)$ is the "on/off" bit pattern of a single writing element (pixel) as it varies in time. The velocity of the photoconductor 11, with an unwanted vibration, is given by:

$$v(t) = v_0 + a\cos(2\pi ft) \quad (3)$$

where $v_0$ is the constant nominal velocity and a is the amplitude of the velocity modulation of temporal frequency f. The relationship between time and position on the photoconductor 11 is given by:

$$t = (x-x')/v_0 - a\sin(2\pi ft)/2\pi f v_0 \quad (4)$$

where x' is an arbitrary initial position on the photoconductor 11.

To compensate for the velocity error and eliminate the line variation, correction must be made to the on/off timing of the image bar (FM) and the time dependent radiance (AM) of the image.

To illustrate the principle of FM correction analytically, consider exposing a single line of desired width $W_0$ and exposure level $E_0$. If the photoconductor 11 is exposed for a nominal time $t_0 = W_0/v_0$, by an ideal infinitely narrow irradiance distribution, $H_2(x) = \delta(x)$, the actual width $W_1$ of the exposure profile (5) will be given by:

$$W_1(t_0) = \int_0^{\infty} v(t)dt \quad (5)$$
$$= \int_0^{\infty} [v_0 + a\cos(2\pi ft)]dt$$
$$= v_0 t_0 + a\sin(2\pi ft_0)/2\pi f$$
$$= W_0 + e\sin(2\pi ft_0)$$

which has an error of magnitude $e = a/2\pi f$. To eliminate this line-width error, the on-time must be adjusted to a value $t_1$ such that $W_1(t_1) = W_0$. That is, $$W_1(t_1) = v_0 t_1 + e\sin(2\pi ft_1) = W_0 = v_0 t_0 \quad (6)$$

or $$t_1 + e\sin(2\pi ft_1)/v_0 = t_0 \quad (7)$$

This transcendental equation can be solved for the required on-time $t_1$ in terms of the nominal on-time $t_0$, e, $v_0$ and f.

The FM corrected line exposure pattern is now given by:

$$E(x') = \int_{-\infty}^{\infty} H_1(x)H_2(t)/v(t)dx = \int_{-\infty}^{\infty} H_1(x)rect(t/t_1)/v(t)dx \quad (8)$$

where $H_2$ is a rectangle of the correct width $W_0$, i.e. the on-time has been corrected. Thus, the geometrical properties of the image by FM correction are made properly. However, the line exposure still depends on the variable velocity v(t) and will not equal the desired exposure $E_0$. Thus FM correction is only partially complete. This approach may be applied to any pattern of lines and solid areas.

In order to completely eliminate the unwanted effects of vibration, AM correction must be employed wherein the irradiance of the image bar is corrected in real time to provide the correct level in the presence of vibrations. This is achieved by multiplying the irradiance function, $H_2(t)$, by an amplitude function $H_3(t)$, which controls the level of irradiance, with the property that:

$$H_3(t) = v(t)/v_0 \quad (9)$$

Then the exposure pattern will be given by $$E(x') = \int_{-\infty}^{\infty} H_1(x)H_2(t)H_3(t)/v(t)dx = \int_{-\infty}^{\infty} H_1(x)H_2(t)/v_0 dx \quad (10)$$

which has been corrected for the time-varying photoconductor velocity. However AM correction alone is not complete either since the on-time (write command) is not corrected to account for the vibration. This can be seen by substituting for the time variable in $H_2$ where:

$$t = (x-x')/v_0 - e\sin(2\pi ft)/v_0 \quad (11)$$

The lowest order solution of this equation is given by:

$$t = (x-x')/v_0 - e\sin[2\pi f(x-x')/v_0]/v_0 \quad (12)$$

which yields $$E(x') = 1/v_0 \int_{-\infty}^{\infty} H_1(x)H_2[(x-x')/v_0 - e\sin[2\pi f(x-x')/v_0]]dx \quad (13)$$

It is clear that this resulting exposure is not exactly equal to the exposure in the absence of vibrations, which is given by:

$$E(x') = 1/v_0 \int_{-\infty}^{\infty} H_1(x)H_2[(x-x')/v_0]dx \quad (14)$$

Thus AM correction likewise only addresses part of the problem. Both AM and FM corrections are needed. The acousto-optic modulator 52 works on the principle that an acoustic wave generated by the signal at input 53 deflects the light beam in accordance with frequency of the input signal. The amplitude modulation provided by circuit 61. In order to suppress banding, AM signal (which is governed by equation (9) (i.e $H_3(t)=v(t)/v0$, produced by AM module 61 in FIG. 2)) should modulate block 61 and FM signal which is governed by Equation (7) (i.e. $t_1+e \sin(2\pi ft_1)/v_0=t_0$) should modulate block 80.

Figure 6:
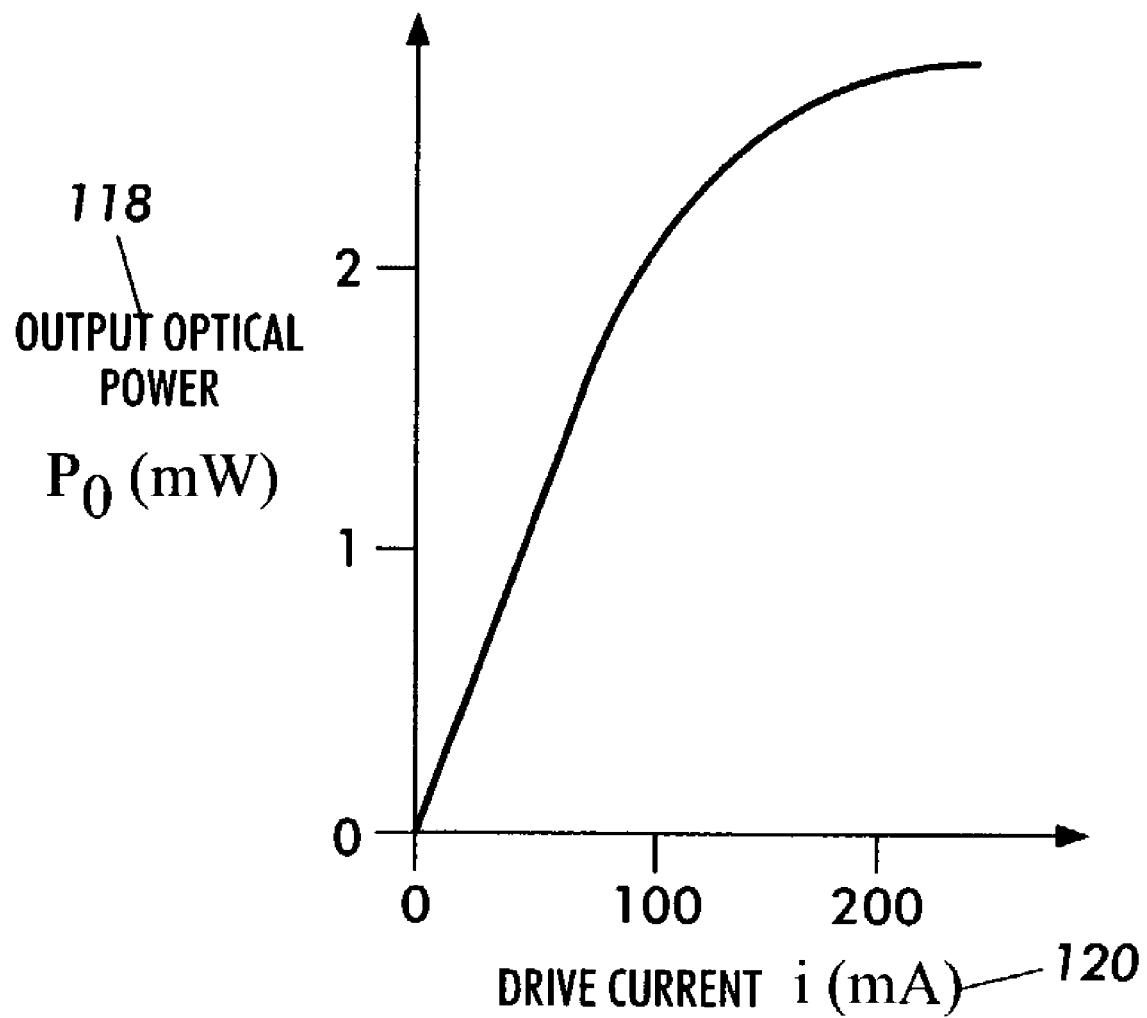
FIG. 6 is a graph illustrating optical power at the output of an actual LED versus drive current.

In another embodiment, if a light emitting diode or LED array (not shown) is used in place of the laser source described above for pixel placement another set of governing equations is derived based on the electrical characteristics for a diode. The LED output optical power $P_0$ is related to output photon flux. Each photon has energy hv, so that:

$$P_0 = h\nu\phi_0 = \eta_{ex}h\nu I/e \quad (15)$$

Where $P_0$ is the output optical power;
h is Plank's constant=$6.6262\times10^{-34}$J-s;
v is photon frequency;
$\Phi_0$ is the output photon flux;
e is Electron charge=$1.6022\times10^{-19}$C;
$\eta_{ex}$ is the external quantum efficiency;
I is the LED drive current;

In accordance with Equation (15), the LED output power $P_0$ should be proportional to the driving current I. In practice, however, this relationship is valid only over a restricted range. For the particular device whose light-current characteristic is shown in FIG. 6, the emitted optical power 118 is proportional to the drive current 120 when the latter is less than about 75 mA.

Figure 7:
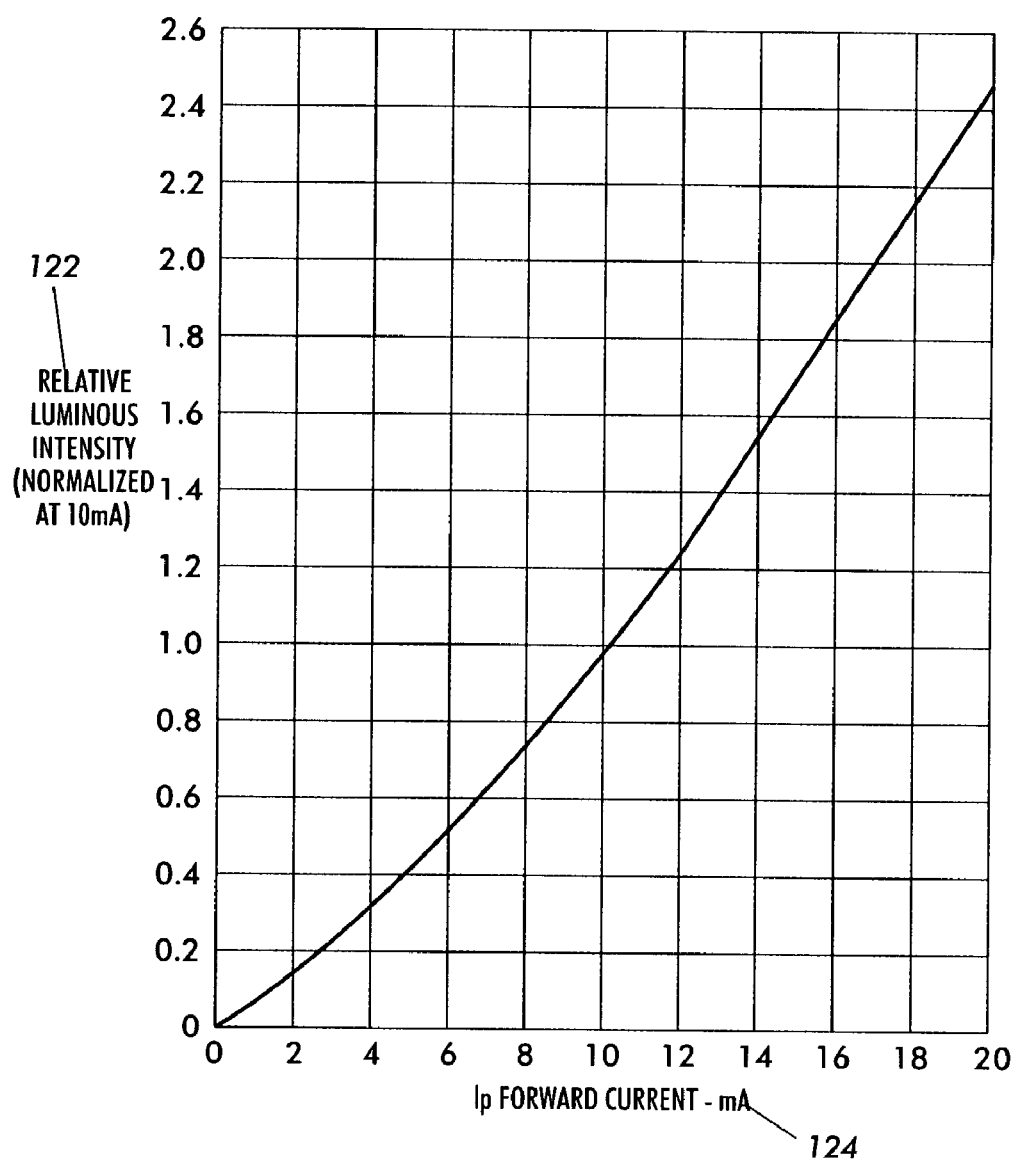
FIG. 7 is a graph showing relative output power vs. current for high efficiency red LED.

Referring to FIG. 7, there is shown a graph of relative output power 122 vs. current 124 for high efficiency red LED, normalized at 10 mA. FIG. 7 is a typical representation of LED, which is used in LED bar for most printer applications (the drive current varying from 1.5 mA to 4.5 mA). Considering that the vibration velocity modulation, m, is less than %4, the deviation in derive current is less than 0.18 mA, to first order approximation it may be assumed that the optical power 122 vs. drive current 124 of each LED is linear.

In accordance with another embodiment for applying electronic banding suppression for an imager in a printer with an LED array (not shown) the equations for modulating the driving current for each LED will be derived. Starting with rectangular irradiance distribution, $H_1(x)$, of width W modulated in time with a simple harmonic, $H_2(t)$, with amplitude m & temporal frequency $\alpha$, we have the expression for $H_1(x)$ is:

$$H_1(x) = H_0 rect(x/W) \quad (16)$$

Figure 8:
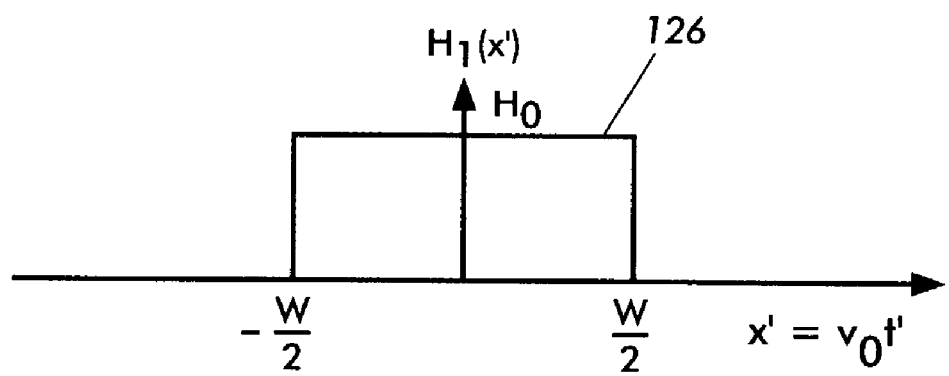
FIG. 8 is a graph showing rectangular irradiance profile $H_1(x)=H_0 \text{rect}(x/W)$.
Figure 9:
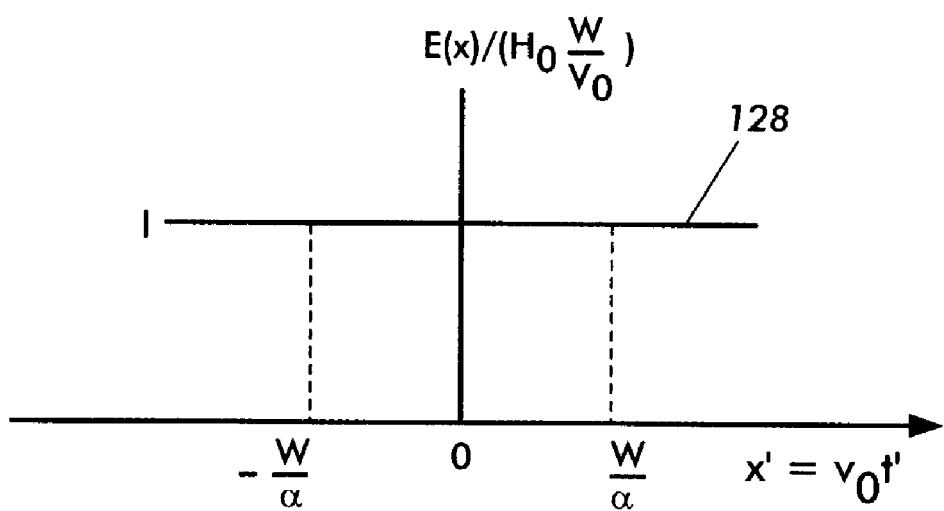
FIG. 9 shows a graph for the normalized exposure distribution due to rectangular irradiance moving, which is obtained by moving the pattern in FIG. 8 with constant velocity $V_0$ (i.e. with no banding) along the x-axis.

Referring now to FIG. 8, the rectangular irradiance profile $H_1(x)=H_0rect(x/W)$ 126 is shown in a graphical representation. FIG. 9 shows the normalized exposure distribution 128 due to rectangular irradiance moving, which is obtained by moving the pattern in FIG. 8 with constant velocity $V_0$ (i.e. with no banding) along the x-axis. The equation for $H_2(t)$ with simple harmonic time dependence is:

$$H_2(t) = 1+m\cos(2\pi\alpha t) \quad (17)$$

where ($\alpha$) is the temporal frequency and (m) is the modulation. Then the Fourier transform of the temporal part of the irradiance is:

$$\overline{H}_2(V_0 u) = \delta(u) + m[\delta(u-\alpha/V_0) + \delta(u+\alpha/V_0)]/2 \quad (18)$$

where $\delta$ is the "Dirac delta function." The Fourier transform of the exposure for this example is:

$$\overline{E}(u) = \overline{H}_1(-u) \cdot \overline{H}_2(V_0 u) \quad (19)$$

Substituting for $\overline{H}_2(V_0 u)$ in Equation (19) gives:

$$\overline{E}(u) = \overline{H}_1(-u)\delta(u)/V_0 + m\overline{H}_1(-u)[\delta(u+\alpha V_0)]/2V_0 \quad (20)$$

Now the first term in Equation (7) gives the spatially constant (average) exposure, while the second term gives the exposure modulation due to the time varying intensity. This can be seen by the inverse Fourier transformation of Equation (20):

$$E(x) = (1/V_0)\overline{H}_1(0) + m\overline{H}_1(-\alpha/V_0)\exp(+i2\pi\alpha x/V_0) + m\overline{H}_1(+\alpha/V_0)\exp(-i2\pi\alpha x/V_0)/2V_0 \quad (21)$$

The spatially constant term is $(1/V_0)\overline{H}_1(0)$, while the Fourier transform component due to the oscillation, $\overline{H}_1(\pm\alpha/V_0)$, gives the spatial variation of exposure.

The exposure distribution may be written in a form that is explicitly real by using the fact that, for real $H_1(x)$, the transform $\overline{H}_1(-u)$ is the complex conjugate of $\overline{H}_1(+u)$. Thus Equation (21) becomes:

$$E(x) = (1/V_0)\overline{H}_1(0) + (m/V_0)[Re[\overline{H}_1(\alpha/V_0)]\cos(2\pi\alpha x/V_0) + Im[\overline{H}_1(+\alpha/V_0)]\sin(2\pi\alpha x/V_0)] \quad (22)$$

where Re[ ] and Im[ ] denote the real and imaginary parts of $\overline{H}_1(\alpha/V_0)$. By differentiation of Equation (22) the maximum exposure values are defined as:

$$E_{max.} = (1/V_0)\overline{H}_1(0) + (m/V_0)|\overline{H}_1(\alpha/V_0)|$$

$$E_{min.} = (1/V_0)\overline{H}_1(0) - (m/V_0)|\overline{H}_1(\alpha/V_0)|$$

where $$|\overline{H}_1(\alpha/V_0)| = [Re^2[\overline{H}_1(\alpha/V_0)] + Im^2[\overline{H}_1(+\alpha/V_0)]]^{1/2}$$

The exposure modulation $$M = (E_{max.} - E_{min.})/(E_{max.} + E_{min.}) \quad (23)$$

is then given by $$M=(m/\overline{H}_1(0))|\overline{H}_1(\alpha/V_0)| \quad (24)$$

Thus the exposure modulation is proportional to the irradiance modulation, m, and to the magnitude of the Fourier transform of the spatial part of the irradiance profile, divided by its average value. Note that the exposure modulation can be obtained directly from the transformed exposure, Equation (20), by adding the positive and negative frequency components and dividing by the average exposure as follows:

$$M=[\overline{E}(\alpha/V_0)|+\overline{E}(-\alpha/V_0)|]/\overline{E}(0) \quad (25)$$

The formulas are easy to understand in the case of an arbitrary symmetric irradiance profile, $H_1(x)$. Then $\overline{H}_1(\alpha/V_0)=\overline{H}_1(-\alpha/V_0)$ and in this case Eq. (8) reduces to:

$$E(x)=(1/V_0)\overline{H}_1(0)+(m/V_0)\overline{H}_1(\alpha/V_0)]\cos(2\pi\alpha x/V_0) \quad (26)$$

The exposure distribution is a harmonic function with spatial frequency $$u=\alpha/V_0 \quad (27)$$

and modulation $$M=(m/\overline{H}_1(0)))|\overline{H}_1(\alpha/V_0)| \quad (28)$$

where $\overline{H}_1(\alpha/V_0)$ is real in the case of symmetric $H_1(x)$. The transform of the rectangular case of Equation (26)(FIG. 8) is:

$$\overline{H}_1(u)=H_0 W \sin c(Wu)$$

where $\sin c(z)=(\sin(\pi z))/(\pi z)$. In this case the exposure distribution is given by:

$$E(x)=(H_0 W/V_0)[1+m \sin c(W\alpha/V_0)\cos(2\pi\alpha x/V_0)] \quad (29)$$

Figure 10:
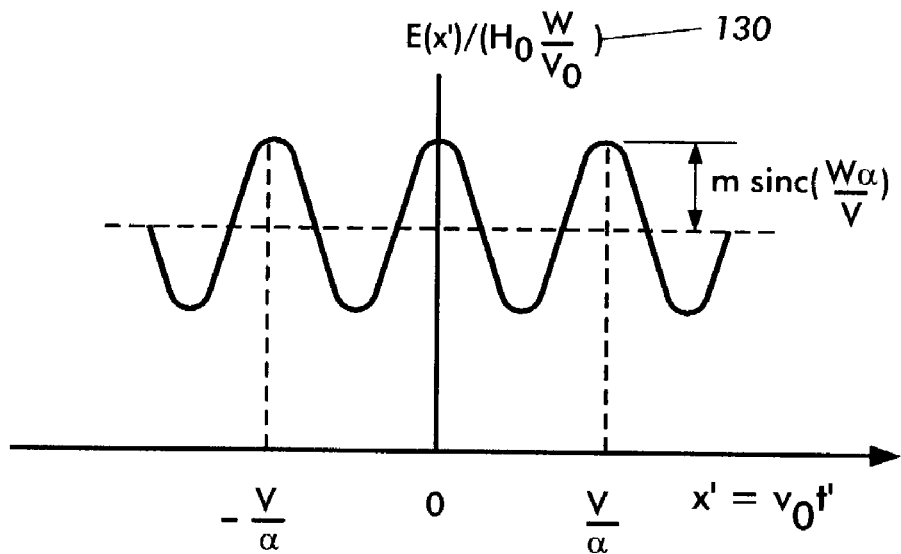
FIG. 10 is a graph illustrating the exposure distribution due to sinusoidal irradiance modulation of rectangular irradiance.

Referring now to FIG. 10, the exposure distribution due to sinusoidal irradiance modulation of rectangular irradiance, Equation (29) is shown. The exposure modulation is then:

$$M=m \sin c(W\alpha/V_0) \quad (30)$$

Figure 11:
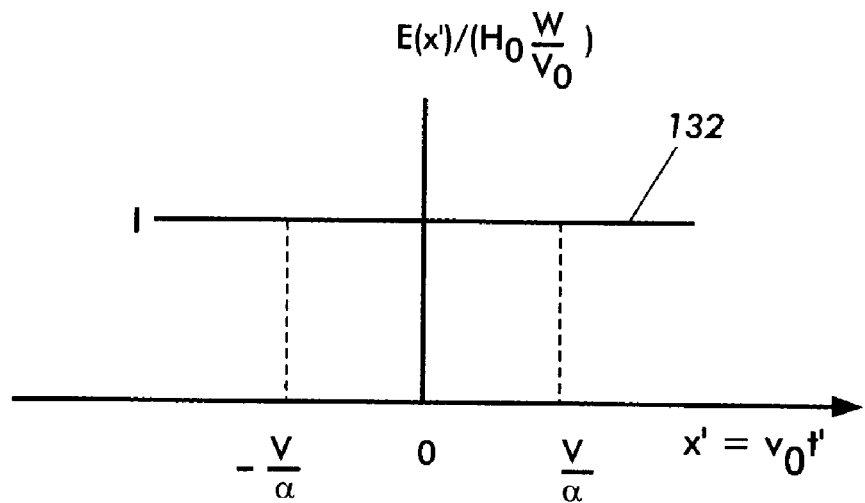
FIG. 11 shows a graph resultant normalized exposure profile after modulating driving current of LED by $-(1/k)$ m $\cos(2\pi\alpha t)$.

Referring once again to FIG. 7 is a typical representation of LED I-V characteristics which is used in LED bar. Considering that the vibration velocity modulation, m, is less than %4, a first order approximation assumes that the optical power vs. drive current of each LED is linear. In order to eliminate banding due to vibration (m cos(2παt)), the driving current is modulated of each LED by −(1/k) m cos(2παt). Where k is the slope of the optical output power of the LED vs. drive current, which is obtained using FIG. 7. Modulating driving current of LED by −(1/k) m cos(2παt) will produce—$(H_0 W V_0)$ m sin $c(W\alpha/V_0)\cos(2\pi\alpha x/V_0)$ extra exposure power profile (because of the linearity). When this added to Equation (29) a constant exposure distribution of $H_0 W/V_0$ is derived. The resultant normalized exposure is shown in FIG. 11 wherein the resultant normalized exposure profile after modulating driving current of LED by −(1/k) m cos(2παt) is shown. Though rectangular irradiance distribution, $H_1(x)$, is used the method is so general that any irradiance distribution (i.e. Gaussian, etc.) could be used for $H_1(x)$. This method may also be extended to multi-temporal vibration frequency & could also correct banding due to irradiance modulation.

Figure 12:
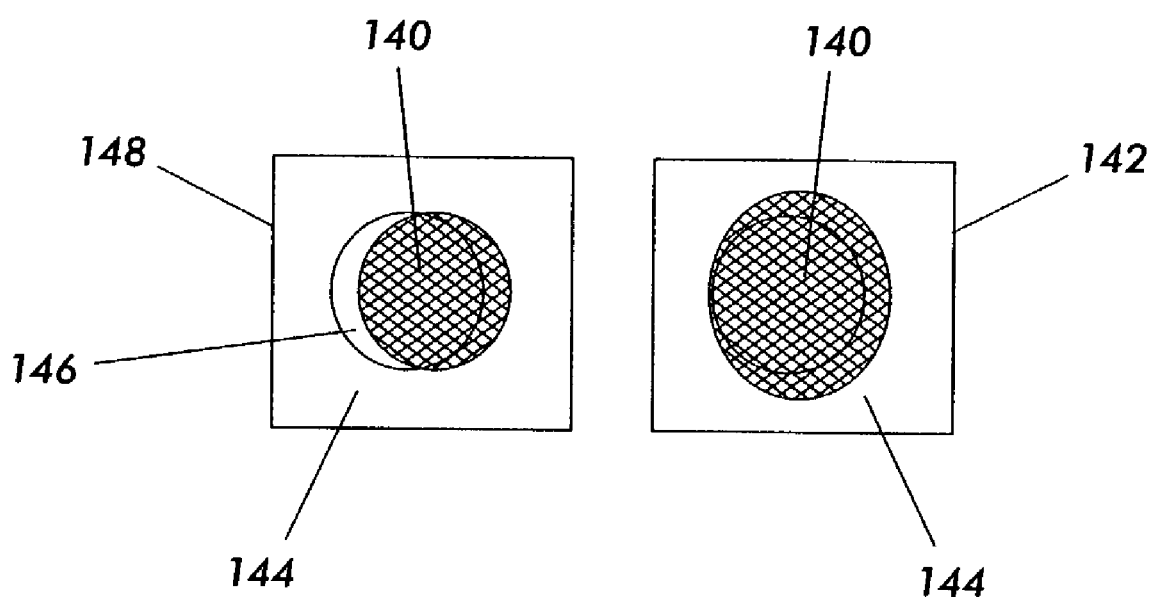
FIG. 12 shows a pictorial representation for utilizing a trapping implementation in the imager with laser driver.

Refering now to FIG. 12, trapping is a device specific command that compensates for registration when two colors 140 and 144 respectively are placed next to each other. Instead of allowing a white space 146 to open up when the registration 148 is imperfect, trapping swells each of the two color areas so that an overlap occurs between butting color areas, which absorbs the misregistration 142. Unwanted white area in the left part of the image 148 can be improved & right side of the image can be obtained electronically. Knowing the destination (right part of the image 142) & having the unwanted image (left part of the image 148) and using AM & FM modulations & controlling AM & FM part from the data which is obtained by comparing the wanted (ultimate) image 142 with unwanted (initial) image 148 trapping can be implemented electronically.

Therefore, electronic trapping implementation in imager with laser driver is provided by comparing an output image from the imager to a reference image to obtain a difference image and calculating one or more frequency and amplitude modulations based on the difference image and applying the one or more frequency and amplitude modulations to the imager until the difference image is eliminated. The comparing may be performed by subtracting the output image from a reference image. Calculating frequency modulations is performed by solving for time utilizing the frequency modulation equation which governs the on/off times as $t_1+e \sin(2\pi f t_1)/V_0=t_0$ wherein $t_1$ is in terms of nominal on-time $t_0$, e (vibration amplitude), $v_0$ (nominal velocity) and f (vibration frequency). Calculating amplitude modulations is performed by solving for intensity of the amplitude modulation equations for governing the intensity as $H_3(t)=v(t)/v_0$ wherein $H_3(t)$ controls the level of irradiance. Therefore, trapping is implemented by applying a combination of timing and amplitude to eliminate the difference image.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An electronic trapping implementation in imager with laser driver, comprising:
   retrieving an output image from an imager;
   comparing the output image to a reference image to obtain a difference image;
   calculating one or more frequency and amplitude modulations based on the difference image; and
   applying the one or more frequency and amplitude modulations to the imager until the difference image is eliminated.

2. The electronic trapping implementation of claim 1 further comprising:
   comparing by subtracting the output image from the reference image.

3. The electronic trapping implementation of claim 1 further comprising:
   calculating frequency modulations by solving for time.

4. The electronic trapping implementation of claim 3 further comprising:
   defining the frequency modulation equation which governs said on/off times as $t_1+e\sin(2\pi f t_1)/v_0=t_0$ wherein $t_1$ is in terms of nominal on-time $t_0$, e (vibration amplitude), $v_0$ (nominal velocity) and f (vibration frequency).

5. The electronic trapping implementation of claim 3 further comprising:
   applying frequency modulations by changes in timing.

6. The electronic trapping implementation of claim 1 further comprising:
   calculating amplitude modulations by solving for intensity.

7. The electronic trapping implementation of claim 6 further comprising the step of:
defining the amplitude modulation equations for governing said intensity as $H_3(t)=v(t)/v_0$ wherein $H_3(t)$ controls the level of irradiance.

8. The electronic trapping implementation of claim 6 further comprising:
applying the amplitude modulations by varying the power.

9. The electronic trapping implementation of claim 1 further comprising:
applying a combination of timing and amplitude to eliminate the difference image.

10. An electronic trapping implementation system, comprising:
means for retrieving an output image from an imager;
means for comparing the output image to a reference image to obtain a difference image;
means for calculating one or more frequency and amplitude modulations based on the difference image; and
means for applying the one or more frequency and amplitude modulations to the imager until the difference image is eliminated.

11. The electronic trapping implementation system of claim 10 further comprising:
means for subtracting the output image from the reference image.

12. The electronic trapping implementation system of claim 10 further comprising:
means for calculating frequency modulations by solving for time.

13. The electronic trapping implementation system of claim 12, further comprising:
defining the frequency modulation equation which governs said on/off times as $t_1 + e\sin(2\pi f t_1)/v_0 = t_0$ wherein $t_1$ is in terms of nominal on-time $t_0$, e (vibration amplitude), $v_0$ (nominal velocity) and f (vibration frequency).

14. The electronic trapping implementation system of claim 10 further comprising:
means for calculating amplitude modulations by solving for intensity.

15. The electronic trapping implementation system of claim 14, further comprising:
means for defining the amplitude modulation equations for governing said intensity as $H_3(t)=v(t)/v_0$ wherein $H_3(t)$ controls the level of irradiance.

16. The electronic trapping implementation system of claim 10 further comprising:
means for applying frequency modulations by changes in timing.

17. The electronic trapping implementation system of claim 10 further comprising:
means for applying the amplitude modulations by varying the power.

18. The electronic trapping implementation system of claim 10 further comprising:
means for applying a combination of timing and amplitude to eliminate the difference image.

19. An electronic trapping implementation in imager with laser driver, comprising:
retrieving an output image from an imager;
comparing the output image to a reference image to obtain a difference image;
calculating one or more frequency and amplitude modulations based on the difference image; and
applying the one or more frequency and amplitude modulations to the imager until the difference image is eliminated by applying a combination of timing and amplitude to eliminate the difference image.

20. The electronic trapping implementation system-of claim 19 further comprising:
defining the frequency modulation equation which governs said on/off times as $t_1 + e\sin(2\pi f t_1)/v_0 = t_0$ wherein $t_1$ is in terms of nominal on-time $t_0$, e (vibration amplitude), $v_0$ (nominal velocity) and f (vibration frequency) and defining the amplitude modulation equations for governing said intensity as $H_3(t)=v(t)/v_0$ wherein $H_3(t)$ controls the level of irradiance.

* * * * *